United States Patent Office 3,090,693
Patented May 21, 1963

3,090,693
MORTAR ADDITIVES
Thomas M. Kelly, Chagrin Falls, and Richard C. Mielenz, Beachwood, Ohio, assignors, by mesne assignments, to Martin-Marietta Corporation, Chicago, Ill., a corporation of Maryland
No Drawing. Filed June 27, 1961, Ser. No. 119,845
10 Claims. (Cl. 106—93)

This invention relates to a new additive composition for incorporation in hydraulic cement mixes, and, more particularly, masonry mortar mixes, and also relates to new and improved mortar mixes containing such additive composition.

To be considered a good masonry mortar mix, a mix must possess a number of specific charactristics. For example, a mix must have a high degree of water retention and good workability and adhesion as well as the ability to produce a mortar which adequately meets the strength requirements such as set forth in the ASTM or other recognized specifications.

Good water retention is one of the most important factors in an acceptable mix because of the desirability of retaining substantially all of the water in the mix before and during the placing of the mortar so as to avoid premature stiffening of the mix. In mixes having poor water retention, there is a tendency for the mix to lose a high proportion of water by evaporation, bleeding or absorption by porous surfaces which come into contact with the mix. For example, when a porous building unit is bedded in mortar, water will be absorbed into the porous structure thereof. The water lost in these situations frequently causes the mix to lose plasticity which creates difficulties in the placement of such a unit. The mortar also may prematurely stiffen which makes it difficult or impossible for a mason to make any changes in the position of the unit without breaking the adhesion between the placed unit and the mortar which it contacts.

Adhesion and workability are also important properties of mortar mixes since mixes possessing these properties can be easily applied (buttered) onto a brick or other building unit without dropping off or loss of a portion or all of the mortar before the brick can be positioned and tapped into its final location.

The workability of a mortar mix also affects the speed and quality of workmanship of the mason doing the brick laying. If a mix does not have good workability, the workman will have difficulty in buttering and properly positioning the brick and as a result will lay fewer bricks in a given period of time. In addition, the lack of workability of a mix renders it exceedingly difficult for the workman to produce a strong, impervious joint.

While it is possible to prepare mortar mixes from cement, sand, and water alone, the resulting mixes are harsh and crumbly and do not possess good working properties. In addition, the water retention of such mixes is undesirably low.

As a result of these deficiencies, it has been customary to replace a portion of the cement with a hydrated lime. This substitution improves the workability and water retention of the mixes but creates other problems. The slaking or hydrating of the lime must be closely supervised to insure that the lime is thoroughly hydrated. If incompletely hydrated lime is incorporated in a mortar mix, the resulting mortar may expand after placement, thus impairing the mortar and in some instances destroying the structural integrity of the wall.

Another problem is the fact that to achieve best results, the hydrated lime should first be mixed with water to form a putty and the cement and sand mixed with the lime putty rather than using dry lime in the mix.

A further problem in the use of cement-lime mortars is the difficulty in achieving and maintaining a sufficiently high air content in the mortar mix. Lime-containing mortars generally have low air contents in the order of 5% or so, whereas, it is generally recognized that air contents in the range of 12–20% are most desirable. Mortars of higher air contents are more resistant to disruption by freezing and thawing and have greater durability. Thus, the employment of cement-lime mortars has not been considered completely satisfactory.

To eliminate the difficulties in the use of lime, additives have been incorporated in the cement during the manufacturing and bagging operations. These cements, commonly referred to as masonry cements, are prepared by integrinding Portland cement, a filler, such as limestone, and an air-entraining agent. In recent years, the use of masonry cements has become widespread due to the convenience of having the additives already incorporated before mixing and due to the fact that mortars made therefrom have improved water retention and workability as compared with most cement-sand mortar mixes and cement-lime-sand mortar mixes.

The addition of materials other than ground limestone and air-entraining agents also has been suggested. For example, Kampf Patent No. 2,857,287 discloses an additive for cement-sand mortar mixes which consists of methyl cellulose of a viscosity of 4000 centipoises, a water-insoluble metal stearate, an air-entraining agent, and an inert filler. Although it is stated in the patent that the use of the Kampf addivitive produces an improvement in water retention, the strength of mortars containing the Kampf additive has been found to be relatively low.

Thus, none of the mortar mixes employed heretofore have attained the desired combination of a high degree of workability and water retention in the mix, together with good durability and relatively high level ultimate strength in the mortar.

However, by employing the additive composition of the present invention in mortar mixes, it is possible to produce high strength mortar of improved durability while greatly increasing the water retention of the mixes and substantially improving the workability thereof prior to and during placement.

The additive composition of the present invention comprises between about 1 part and 5 parts by weight of waste sulfite liquor solids and between about ½ part and 5 parts by weight of a high-viscosity grade hydroxyalkyl cellulose such as hydroxyethyl cellulose, hydroxypropyl cellulose or one of the other short chain hydroxyalkyl celluloses.

The additive composition of the present invention is generally employed in an amount between about 0.1% and 1% by weight of the cement, and preferably between about 0.25% and 0.75%. Advantageously, the waste sulfite liquor solids will comprise between about 0.1% and 0.5% by weight of the cement with the hydroxyalkyl cellulose comprising between about 0.05% and 0.5% by weight of the cement. Preferably, the proportions of the waste sulfite liquor solids are between about 0.2% and 0.4% and the hydroxyalkyl cellulose between about 0.1% and 0.4%.

The waste sulfite liquor solids referred to herein may be derived from either the neutralized or unneutralized liquor and may consist primarily of only lignosulfonic acid or a salt thereof, or they may include some or all of the various other solids in the liquors. The solids of neutralized liquors, which are preferred for the purposes of the present invention, are obtained by converting the free acids in the liquor to salts through the use of bases such as the hydroxides of calcium, magnesium, ammonia or sodium, with calcium being the most common.

It is desirable that a substantial portion of the carbohydrates be removed from the waste sulfite liquor solids prior to their use in the mortar mixes of the invention. This may be accomplished, for example, by removing the fermentable sugars from the liquor as disclosed in U.S. Patent 2,435,594 to MacPherson, although other purification procedures to remove a portion of the carbohydrates may be employed. Also, for example, the lignosulfonic acid component may be separated from the liquor and used alone as a soluble salt, as disclosed in U.S. Patent 2,141,570 to Mark.

In the additive composition of the invention, the waste sulfite liquor solids may be used either in the liquid form or as the dried residue thereof, but for convenience, they are all referred to as "waste sulfite liquor solids."

The hydroxyalkyl cellulose employed in the additive composition of the invention is a high viscosity grade, that is, a 2% aqueous solution thereof at 20° C. has a viscosity above about 1000 centipoises. The viscosity may be as high as 20,000 to 30,000 centipoises or higher. Preferably, a hydroxyethyl cellulose having a viscosity in the range of about 3000 to 6000 centipoises or even up to 10,000 centipoises is employed.

In addition to the waste sulfite liquor solids and the hydroxyalkyl cellulose, other materials which are commonly employed may be incorporated in mortar mixes with the additive composition so long as they do not impair the action of the additive composition. For example, stearic acid or derivatives thereof may be employed if improved water impermeability of the hardened mortar is desired. In addition, small amounts of materials such as calcium chloride and triethanolamine may be included to accelerate setting, if desired.

The following examples show the benefits to be derived by employing the additive composition of the present invention in mortar mixes. As will be seen hereafter, the employment of this additive composition in mortar mixes improves the water retention of the mix and also produces an improvement in the ultimate strength of the mortar. In the examples, the sand employed was masons sand, conforming with ASTM C144 (saturated-surface dry). In preparing the mortar mixes, the proportioning of the cement and sand was done by volume assuming one cubic foot of Portland cement weighed 94 pounds, one cubic foot of masonry cement weighed 70 pounds, and one cubic foot of sand weighed 75 pounds. The water retention, air content and compressive strength measurements were made in accordance with ASTM methods C91–58, C185–58T and C109–58, respectively.

The following Examples I and II show the benefits achieved when employing the additive composition of the invention in 1:3 masonry cement-sand mortars prepared from two different brands of masonry cement.

*Example I*

|  | (A) | (B) |
|---|---|---|
| Total Additive (lbs. per sack): |  |  |
| Waste sulfite liquor solids | None | 0.2 |
| Hydroxyethyl cellulose (3,000–6,000 cps.) | None | 0.1 |
| Emulsified stearic acid | None | 0.05 |
| Air content (percent) | 15.7 | 16.1 |
| Water content (gal./sack) | 4.5 | 4.4 |
| Water retention (percent) | 79.0 | 89.0 |
| 7-day compressive strength (p.s.i.) | 980 | 1,342 |
| 28-day compressive strength (p.s.i.) | 1,430 | 1,710 |

*Example II*

|  | (C) | (D) |
|---|---|---|
| Total Additive (lbs. per sack): |  |  |
| Waste sulfite liquor solids | None | 0.2 |
| Hydroxyethyl cellulose (3,000–6,000 cps.) | None | 0.1 |
| Emulsified stearic acid | None | 0.05 |
| Air content (percent) | 16.7 | 17.6 |
| Water content (gal./sack) | 4.4 | 4.4 |
| Water retention (percent) | 69.0 | 90.0 |
| 7-day compressive strength (p.s.i.) | 1,320 | 1,420 |
| 28-day compressive strength (p.s.i.) | 1,830 | 1,883 |

The following Example III shows that the elimination of the emulsified stearic acid from type I Portland cement-sand mortar mixes does not significantly affect air content, water retention, or compressive strength. These mixes were 1:6 mixes.

*Example III*

|  | (E) | (F) |
|---|---|---|
| Total Additive (lbs. per sack): |  |  |
| Waste sulfite liquor solids | 0.2 | 0.2 |
| Hydroxyethyl cellulose (3,000–6,000 cps.) | 0.25 | 0.25 |
| Emulsified stearic acid | 0.05 | None |
| Air content (percent) | 14.8 | 13.8 |
| Water content (gal./sack) | 9.9 | 9.9 |
| Water retention (percent) | 83.1 | 85.1 |
| 7-day compressive strength (p.s.i.) | 691 | 799 |
| 28-day compressive strength (p.s.i.) | 1,351 | 1,398 |

The following Example IV shows the results achieved when different cellulose ethers are employed with the additive composition of the invention in 1:3 masonry cement-sand mortar mixes.

*Example IV*

|  | (G) | (H) |
|---|---|---|
| Total Additive (lbs. per sack): |  |  |
| Waste sulfite liquor solids | 0.2 | 0.2 |
| Emulsified stearic acid | 0.05 | 0.05 |
| Hydroxyethyl cellulose (3,000–6,000 cps.) | 0.1 | None |
| Sodium carboxymethyl cellulose (20,000–50,000 cps.) | None | 0.1 |
| Air content (percent) | 17.4 | 19.4 |
| Water content (gal./sack) | 6.1 | 6.1 |
| Water retention (percent) | 89.0 | 74.0 |
| 7-day compressive strength (p.s.i.) | 1,260 | 985 |
| 28-day compressive strength (p.s.i.) | 1,715 | 1,440 |

Example V shows the effect of substituting a low viscosity grade hydroxyethyl cellulose for the high viscosity grade hydroxyethyl cellulose in the additive of the invention when used in 1:6 type I Portland cement-sand mortar mixes.

*Example V*

|  | (I) | (J) |
|---|---|---|
| Total Additive (lbs. per sack): |  |  |
| Waste sulfite liquor solids | .02 | 0.2 |
| Hydroxyethyl cellulose (3,000–6,000 cps.) | 0.25 | None |
| Hydroxyethyl cellulose (9–12 cps.) | None | 0.25 |
| Emulsified stearic acid | 0.05 | 0.05 |
| Air content (percent) | 19 | 23.5 |
| Water content (gal./sack) | 8.7 | 7.8 |
| Water retention (percent) | 89.0 | 61.0 |
| 7-day compressive strength (p.s.i.) | 970 | 855 |
| 28-day compressive strength (p.s.i.) | 1,580 | 1,530 |

Example VI shows the results for a 1:6 type I Portland cement-sand mortar mix (K) without any additive, a mix (L) containing the additive composition of the invention, and a mix (M) containing an additive known in the art.

*Example VI*

|  | (K) | (L) | (M) |
|---|---|---|---|
| Total Additive (lbs. per sack): |  |  |  |
| Waste sulfite liquor solids | None | 0.2 | None |
| Hydroxyethyl cellulose (3,000–6,000 cps.) | None | 0.25 | None |
| Emulsified stearic acid | None | 0.05 | None |
| Methyl cellulose (3,000–6,000 cps.) | None | None | 0.15 |
| Aluminum stearate | None | None | 0.05 |
| Alkyl aryl sulfonate | None | None | 0.025 |
| Ground silica | None | None | 1.775 |
| Air content (percent) | 9.8 | 17.1 | 30.4 |
| Water content (gal./sack) | 9.9 | 9.2 | 9.2 |
| Water retention (percent) | 40.0 | 81.5 | 85.0 |
| 7-day compressive strength (p.s.i.) | 845 | 765 | 315 |
| 28-day compressive strength (p.s.i.) | 1,550 | 1,525 | 640 |

Example VII shows a comparison between the results obtained when the amount of alkyl aryl sulfonate employed in mix (M) was reduced to lower the air content in an attempt to increase the compressive strength of a 1:6 type I Portland cement-sand mortar.

*Example VII*

|  | (N) | (O) |
|---|---|---|
| Total Additive (lbs. per sack): |  |  |
| Waste sulfite liquor solids | 0.2 | None |
| Hydroxyethyl cellulose (3,000–6,000 cps.) | 0.25 | None |
| Emulsified stearic acid | 0.05 | None |
| Methyl cellulose (3,000–6,000 cps.) | None | 0.15 |
| Aluminum stearate | None | 0.05 |
| Alkyl aryl sulfonate | None | 0.005 |
| Ground silica | None | 1.775 |
| Air content (percent) | 19.0 | 20.8 |
| Water content (gal./sack) | 8.7 | 9.2 |
| Water retention (percent) | 89.0 | 75.6 |
| 7-day compressive strength (p.s.i.) | 970 | 495 |
| 28-day compressive strength (p.s.i.) | 1,580 | 805 |

As shown by Example III above, the presence or absence of emulsified stearic acid in the additive composition of the invention does not significantly affect the air content or water retention of the mortar mixes or the compressive strength of the mortars. As pointed out above, the function of the stearic acid is to make the mortar more water repellent. Example V shows that substituting a low viscosity grade cellulose ether for the high viscosity grade cellulose ether of the additive composition of the invention results in a substantial reduction in the water retention of mortar mixes.

The foregoing detailed description and specific examples show that the employment of the additive composition of the invention in mortar mixes results in an improvement in the durability of the mortar and an increase in the ultimate strength thereof. Morever, the employment of the additive composition provides a number of advantages in the preparation and use of mortar mixes. The workability, cohesiveness and water retentive qualities of the mix are improved. Thus, the mortar does not stiffen prematurely from rapid extraction of water therefrom by absorptive brick or other building units, so that even if the position of a building unit be adjusted after it has been placed on a mortar bed, the mortar will adhere to the unit and maintain a tight bond therewith.

It is apparent from the above description that various modifications in the specific additive formulations and procedures described may be made within the scope of the invention. For example, while the above examples show the results achieved with the additive composition of the invention when incorporated in lime-free mortar mixes, the additive composition also provides benefits, particularly improved water retention and durability when employed in cement-lime mixes. Therefore, the invention is not intended to be limited to the particular formulations and procedures described in detail herein, except as may be required by the appended claims.

What is claimed is:

1. An additive for mortar mixes consisting essentially of between about 1 part and 5 parts by weight of waste sulfite liquor solids and between about ½ part and 5 parts by weight of a high viscosity grade short chain hydroxyalkyl cellulose; said waste sulfite liquor solids containing a compound selected from the group consisting of lignosulfonic acid and salts thereof.

2. An additive for mortar mixes consisting essentially of between about 2 parts and 4 parts by weight of waste sulfite liquor solids and between about 1 part and 4 parts by weight of a high viscosity grade short chain hydroxyalkyl cellulose; said waste sulfite liquor solids containing a compound selected from the group consisting of lignosulfonic acid and salts thereof.

3. An additive for mortar mixes consisting essentially of between about 1 part and 5 parts by weight of waste sulfite liquor solids and between about ½ part and 5 parts by weight of a high viscosity grade hydroxyethyl cellulose, a 2% aqueous solution of solid cellulose having a viscosity above about 1000 centipoises at 20° C; said waste sulfite liquor solids containing a compound selected from the group consisting of lignosulfonic acid and salts thereof.

4. An additive for mortar mixes consisting essentially of between about 1 part and 5 parts by weight of waste sulfite liquor solids and between about ½ part and 5 parts by weight of a high viscosity grade hydroxyethyl cellulose, a 2% aqueous solution of said cellulose having a viscosity between about 3000 and 6000 centipoises at 20° C.; said waste sulfite liquor solids containing a compound selected from the group consisting of lignosulfonic acid and salts thereof.

5. An additive for mortar mixes consisting essentially of between about 2 parts and 4 parts by weight of waste sulfite liquor solids and between about 1 part and 4 parts by weight of a high viscosity grade hydroxyethyl cellulose, a 2% aqueous solution of said cellulose having a viscosity between about 3000 and 6000 centipoises at 20° C.; said waste sulfite liquor solids containing a compound selected from the group consisting of lignosulfonic acid and salts thereof.

6. A mortar mix consisting essentially of a hydraulic cement, sand, water and between about 0.1% and 1% by weight of the cement of an additive comprising between about 1 part and 5 parts by weight of waste sulfite liquor solids and between about ½ part and 5 parts by weight of a high viscosity grade short chain hydroxyalkyl cellulose; said waste sulfite liquor solids containing a compound selected from the group consisting of lignosulfonic acid and salts thereof.

7. A mortar mix consisting essentially of a hydraulic cement, sand, water and between about 0.1% and 1% by weight of the cement of an additive comprising between about 2 parts and 4 parts by weight of waste sulfite liquor solids and between about 1 part and 4 parts by weight of a high viscosity grade short chain hydroxyalkyl cellulose; said waste sulfite liquor solids containing a compound selected from the group consisting of lignosulfonic acid and salts thereof.

8. A mortar mix consisting essentially of a hydraulic cement, sand, water and between about 0.1% and 1% by weight of the cement of an additive comprising between about 1 part and 5 parts by weight of waste sulfite liquor solids and between about ½ part and 5 parts by weight of a high viscosity grade hydroxyethyl cellulose, a 2% aqueous solution of said cellulose having a viscosity above about 1000 centipoises at 20° C.; said waste sulfite liquor solids containing a compound selected from the group consisting of lignosulfonic acid and salts thereof.

9. A mortar mix consisting essentially of a hydraulic cement, sand, water and between about 0.1% and 1% by weight of the cement of an additive comprising between about 1 part and 5 parts by weight of waste sulfite liquor solids and between about ½ part and 5 parts by weight of a high viscosity grade hydroxyethyl cellulose, a 2% aqueous solution of said cellulose having a viscosity between about 3000 and 6000 centipoises at 20° C.; said said waste sulfite liquor solids containing a compound selected from the group consisting of lignosulfonic acid and salts thereof.

10. A mortar mix consisting essentially of a hydraulic cement, sand, water and between about 0.25% and 0.75% by weight of the cement of an additive comprising between about 2 parts and 4 parts by weight of waste sulfite liquor solids and between about 1 part and 4 parts by weight of a high viscosity grade hydroxyethyl cellulose, a 2% aqueous solution of said cellulose having a viscosity between about 3000 and 6000 centipoises at 20° C.; said waste sulfite liquor solids containing a compound selected from the group consisting of lignosulfonic acid and salts thereof.

References Cited in the file of this patent

UNITED STATES PATENTS 2,141,570 Mark _____ Dec. 27, 1928
2,435,594 MacPherson _____ Feb. 10, 1958
2,549,507 Morgan et al. _____ Apr. 17, 1951
2,570,827 Madison et al. _____ Oct. 9, 1951
2,655,004 Wertz _____ Oct. 13, 1953
2,927,033 Benedict et al. _____ Mar. 1, 1960

UNITED STATES PATENT OFFICE
CERTIFICATE OF CORRECTION

Patent No. 3,090,693 May 21, 1963

Thomas M. Kelly et al.

It is hereby certified that error appears in the above numbered patent requiring correction and that the said Letters Patent should read as corrected below.

Column 2, line 14, for "integrinding" read -- intergrinding --; column 4, Example III, first column, line 2 thereof, for "sulfire" read -- sulfite --; column 6, line 5, for "solid" read -- said --; line 63, strike out "said".

Signed and sealed this 10th day of December 1963.

SEAL)
Attest:

RNEST W. SWIDER

Attesting Officer

EDWIN L. REYNOLDS

Acting Commissioner of Patents